March 26, 1940.   C. F. SEMON ET AL   2,194,771
THERMOSTATIC LIQUID FLOW CONTROL DEVICE
Filed March 25, 1937
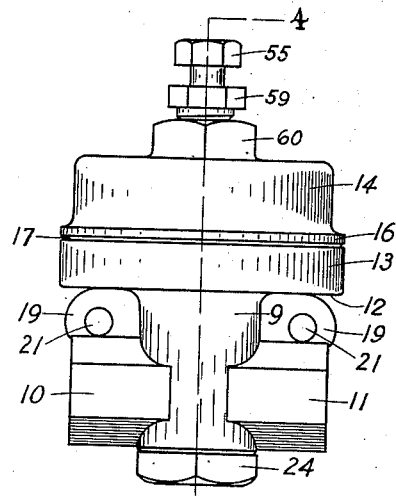
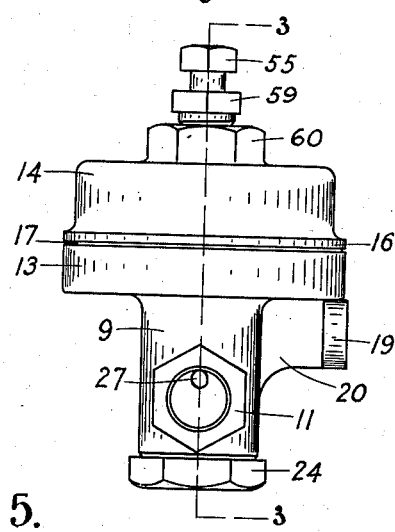
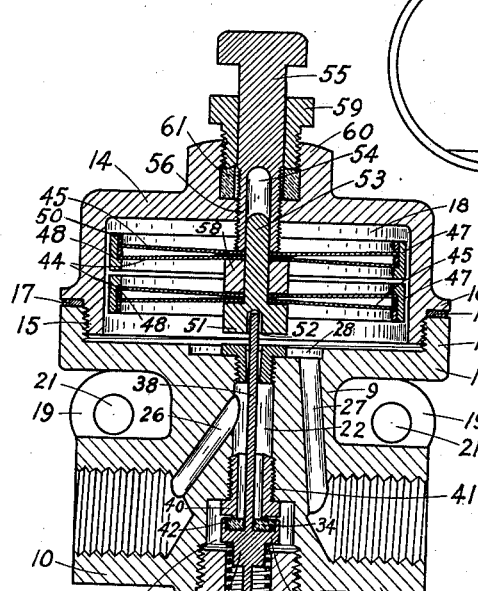
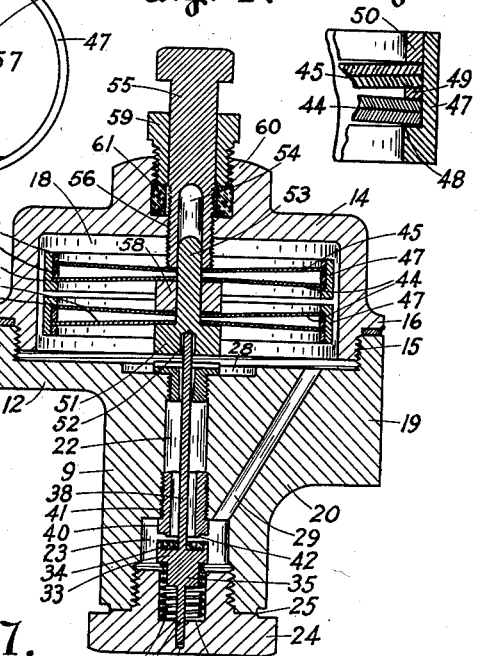
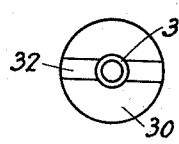
INVENTORS
C. F. Semon & A. L. Semon
BY
John A. Seifert
ATTORNEY Patented Mar. 26, 1940

2,194,771

UNITED STATES PATENT OFFICE 2,194,771

THERMOSTATIC LIQUID FLOW CONTROL DEVICE

Charles F. Semon and Albert L. Semon, East Orange, N. J.

Application March 25, 1937, Serial No. 132,928

5 Claims. (Cl. 236—93)

This invention relates to thermostatic liquid flow controlling devices for regulating the flow of liquid and particularly adapted to control the flow of liquid used in the cooling system of an apparatus, such as refrigerators, and it is an object of the invention to provide a thermostatic liquid flow control device which is of novel construction to permit replacement or cleaning of the working parts without disconnecting the device from the apparatus to which it is connected.

It is another object of the invention to provide a thermostatic element of novel construction which will eliminate all noise during the operation of the device.

It is a further object of the invention to provide a device of this character which is adapted to be connected to a supply of liquid of various temperatures.

In carrying out the invention there is provided a casing having a chamber arranged with an inlet port connected to the cooling system of an apparatus and a source of liquid supply and an outlet port connected to a waste conduit. The inlet port is connected to the casing chamber to provide a slow flow of liquid to the chamber and the outlet port is in fully open communication with the casing chamber. The full flow of the liquid through the casing chamber from the inlet port to the outlet port is controlled by a valve mounted in a valve chamber opening to the casing chamber and the inlet port. The valve is interposed between the valve chamber and inlet port and is yieldingly positioned to close said communication between the valve chamber and inlet port, and is actuated to open position to permit the full flow of the liquid through the casing chamber and to the waste conduit by a thermostatic element mounted in the casing chamber to be affected by the temperature of the liquid in the casing chamber. The thermostatic element comprises a pair of bi-metallic thermostatic disks or pairs of said disks, depending on the closing force of the valve and the pressure and quantity of the liquid, of dish shape fixed at the peripheries thereof with the convex surfaces of the disks of each pair of disks in opposed spaced relation to each other. The pair of disks is connected to the valve and adapted to be adjustably positioned relative to said valve connection from the exterior of the casing.

In the drawing accompanying and forming a part of this application, Figure 1 is an elevational view of the device.

Figure 2 is an elevational view looking at the right of Figure 1.

Figure 3 is a sectional view, on an enlarged scale, taken on the line 3—3 of Figure 2, showing the connection between the casing chamber and outlet port, and the connection between the valve chamber and inlet port.

Figure 4 is a sectional view, on an enlarged scale, taken on the line 4—4 of Figure 1, showing the connection between the casing and valve chambers.

Figure 5 is a view of a pair of thermostatic disks.

Figure 6 is an elevational view of an element forming the slow flow passage for the liquid from the inlet port to the casing chamber.

Figure 7 is a view looking at the top of Figure 6 to show more fully the slow flow passage; and Figure 8 is a fragmentary view, on an enlarged scale, of the manner in which the peripheries of the disks are fixed in spaced relation to each other.

The embodiment of the invention illustrated in the accompanying drawing comprises a casing 9 having at an end portion thereof a pair of bosses 10, 11 integral with and extending laterally from opposite side portions of the casing and internally screw threaded for releasable connection in a fluid carrying pipe (not shown). The end portion of the casing opposite the end arranged with the bosses is arranged with a flat disk portion 12 extending in a plane transverse to the longitudinal axis of the casing 9 and having a flange 13 extending perpendicularly from the peripheral portion thereof with the inner face of said flange screw threaded for the releasable mounting of a cap member 14, as at 15 in Figures 3 and 4, and said cap member having a shoulder 16 integral with and extending laterally from the exterior side thereof to abut the end of the flange 13 with a washer interposed between the flange and shoulder to provide a liquid tight joint, as at 17. When the cap member is mounted on the disk portion 12 of the casing 9, there is formed a circular chamber 18 of greater diameter than depth, as clearly shown in Figures 3 and 4.

The casing 9 is adapted to be mounted on a suitable support (not shown) to relieve the weight of the casing from the water carrying pipe which may cause leakage at the connections of the bosses 10, 11 with said pipe, by arranging the casing with a pair of integral ears 19 carried by the casing below the disk portion 12 by a rib 20 (Figure 2) with the ears extending from opposite sides of the casing and arranged with openings 21 in said extended portions for the engagement of screws to secure the casing to the support.

The casing 9 has a bore 22 extending on the longitudinal axis thereof from the end portion arranged with the bosses 10, 11 to the disk portion with the end portion of the bore adjacent and intermediate the bosses 10, 11 arranged as a circular valve chamber 23 open at the end of the casing 9 and screw threaded at said open end portion for the removable engagement of a closure plug 24, as shown in Figures 3 and 4. The portion of the casing 9 around the open end of the valve chamber 23 is flat to be engaged by a flat surface of the plug to form a liquid tight seal, as at 25.

In the present embodiment of the invention, the boss 10 is connected to the portion of the liquid carrying pipe which delivers liquid to the casing 9 from the cooling system of an apparatus and the boss 10 is in fully open communication with the bore 22 through a passage 26, as shown in Figure 3, the boss 10 and said passage constituting the inlet port of the casing. The boss 11 is connected to the portion of the liquid carrying pipe leading to a place of disposal for the liquid and is in fully open communication with the casing chamber 18 through a passage 27 leading from the inner end of said boss 11 through the casing 9 to a circular recess concentric of the bore 22 in the face of the disk portion 12, as at 28 in Figure 3, the boss 11 and passage 27 constituting the outlet port of the casing. The valve chamber 23 is in fully open communication with the casing chamber 18 through a passage 29 extending from the inner end portion of the chamber at one side of the bore 22 through the rib 20 and opening in the face of the disk portion 12 intermediate the flange 13 and the recess 28, as shown in Figure 4.

To permit a slow flow of liquid from the boss 10 to the casing chamber 18 through the passage 26 and bore 22 for a purpose to be hereinafter described, the end of the bore opening to the casing chamber 18 is restricted by a headed bushing 30 screw threaded in said end of the bore 22 with the head abutting the bottom wall of the recess 28 and the bore of the bushing being tapered from the head end to the opposite end, as at 31 in Figures 6 and 7, and the larger end of the bore leading to a transverse slot 32 in the head of the bushing, which slot will facilitate the distribution of the liquid in the casing chamber and the engagement and removal of the bushing by a screw-driver. The liquid delivered to the casing chamber 18 by the slow flow of liquid through the bushing is continuously discharged from said chamber through the passage 27 and boss 11. The depth of the recess 28 and the thickness of the head of the bushing 30 is approximately the same so that the top of the head will be flush with the face of the disk portion 12.

The full flow of liquid from the boss 10 may be delivered to the chamber 18 through the bore 22, valve chamber 23 and passage 29. It is the principal purpose of this device to control this full flow of liquid through the casing chamber 18 and this purpose is accomplished by a valve comprising a body portion 33 having a recess at one end carrying packing material, as at 34, and a reduced portion 35 at the opposite end extending into a recess 36 in the closure plug 24. The valve is slidably mounted to have movement on the longitudinal axis of the bore 22 by stem portions 37, 38 extending from the opposite ends of the valve, the portion 37 being shorter than portion 38 and adapted to slidably engage in a bore in the closure plug extending centrally from the bottom wall of the recess 36, as at 39, and the longer stem 38 extending through the bore 22 and the bore 31 of the bushing 30 into the chamber 18, as shown in Figures 3 and 4. The diameter of the stem portion 38 is slightly less than the smallest diameter of the bore 31 of the bushing 30 to permit the slow flow of liquid from the boss 10 to the casing chamber 18. The stem portions 37, 38 may be integral with the valve portions 33, 35, as shown, or they may be formed by a rod passed through and fixed to the valve, as by sweating, with the opposite ends of the rod extending from the opposite ends of the valve the required distances to form the portions 37 and 38. The packing material 34 is adapted to engage a seat in the form of a bushing having a laterally extending shoulder 40 adjacent one end and the longer end of the bushing extending from the shoulder being screw threaded to removably mount the bushing in the end portion of the bore 22 adjacent the valve chamber 23, as at 41, with the shoulder 40 abutting the wall of the chamber 23 encircling the bore 22. The shorter portion of the bushing extending from the shoulder 40 forms the valve seat, as at 42. The valve is yieldingly urged in a direction toward the bore 22 to normally engage the packing material 34 with the seat 42, as shown in Figure 3, by a spring 43 mounted in the recess 36 of the closure plug 24 with one end abutting the bottom of the recess 36 and the opposite end portion encircling the reduced portion 35 and abutting the body portion 33 of the valve.

The full flow of the liquid is prevented from passing through the casing by the normal position of the valve, as shown in Figure 3, until the liquid in the cooling system connected to the boss 10 and in the casing chamber 18 reaches a predetermined temperature when the valve is actuated against the force of the spring 43 to the open position shown in Figure 4 by a thermostatic element mounted in the casing chamber 18 and which is responsive to variations in the temperature of the liquid in said chamber. The thermostatic element forming the principal embodiment of this invention is designed to positively actuate the valve to open position without the noise which is prevalent in thermostatic elements now in commercial use. In the present embodiment of the invention the thermostatic element comprises two pairs of disks 44, 45 of dish or curved shape in cross section with the curvature extending concentrically of the disks and having straight edge portions diametrically opposite from each other, as shown at 46 in Figure 5, to eliminate the snapping of the disks and permit a greater movement of the disks under low temperature and circulation of liquid in the chamber 18. Each of the disks 44, 45 is composed of two juxtaposed metallic disks having different co-efficients of expansion and united together as by fusing or otherwise, as shown in Figure 8, and the convex faces of each disk 44, 45 having a different metal than the concave face of said disk. The disks 44, 45 of each pair of disks are fixed at the arcuate peripheries thereof in an annular member 47 with the convex faces of the disks 44, 45 facing each other. Each of the annular members 47 is arranged with an internal shoulder at one end against which shoulder the peripheral portion of the concave face of the disks 44 rest, as at 48. The peripheral portions of the convex faces of the disks 44, 45 are maintained in spaced relation by an annular spacer 49 forced within the annular member 47 against the peripheral portion of the convex face of the disk 44, and the disks 45 being secured in the annular members 47 against the annular spacers 49 by an annular retaining member 50 forced within the annular members 47 against the peripheral portion of the concave face of the disks 45, as shown in Figure 8. The peripheral portions of the disks 44, 45 are spaced apart a distance by the spacers 49 to position the center portions of the disks 44, 45 in spaced relation to each other, as shown in Figure 3. The disks 44, 45 are mounted in the annular members 47 with the straight edge portions 46 in alinement with each other.

The pair of thermostatic elements 44, 45, 47 are mounted centrally in the casing chamber 18 and supported by the valve stem portion 38 by a carrier comprising a head portion 51 having a recess in the center of one end thereof adapted to be engaged by the free end of the stem portion 38, as at 52, and a shank portion 53 integral with and projecting from the opposite end of the head to slidably engage an elongated recess 54 in the end of an abutment member 55 screw threaded in a perforation centrally of the cap member 14, as at 56. The disks 44, 45 are arranged with perforations 57 to engage each pair of disks on the shank portion 53 with the disk 45 of one pair of disks resting on the head 51 and the disk 44 of the other pair of disks resting on a spacing collar 58 engaged on the shank portion 53 and resting on the disk 44 of the first named pair of disks, as shown in Figures 3 and 4.

The abutment member 55 may be adjusted in a direction into and out of the chamber 18 to vary the position of the center portions of the disks 44, 45 of each pair of disks relative to each other and position the valve 33 from the valve seat 42 to permit a greater flow of liquid through the casing chamber 18 in the normal position of the valve. The abutment member 55 is retained in adjusted position by a locking sleeve nut 59 slidably engaged on the abutment member and screw threaded in a boss 60 integral with and projecting from the top of the cap member 14 centrally around the opening 56 therein with a ring of packing material engaged in said boss 60 to be engaged by the locking nut 59 and be impinged about the abutment member 55 to prevent leakage of liquid through the opening 56, as at 61.

In the operation of the device hereinbefore described the parts thereof will normally be in the position shown in Figure 3 with the valve 33 closing the full flow of liquid from the inlet port 10, 26 to the outlet port 11, 27 through the casing chamber 18 while a slow flow of liquid is maintained from the inlet port 10, 26 to the casing chamber 18 where a small quantity of liquid will come into contact with the thermostatic disks 44, 45. When the liquid in the cooling system which is connected to the inlet port 10, 26 rises in temperature due to the fact that the full flow of the liquid is not passing through said cooling system, a small quantity of said liquid having an elevated temperature enters the casing chamber 18 through the bore 31 of the bushing 30 and cause the center portions of the disks 44, 45 to expand and move away from each other which will move the carrier 51, 53 in the elongated recess 54 in the abutment member 55 in a direction away from said abutment member and position the valve 33 from the seat 42 through the stem portion 38, as shown in Figure 4. When the temperature of the liquid in the cooling system and the casing chamber 18 has dropped to a predetermined degree which depends on the adjustment of the abutment 55, the disks 44, 45 will assume their normal position which will position the valve 33 in engagement with the seat 42, as shown in Figure 3.

It should be understood that the number of pairs of thermostatic disks 44, 45 may vary depending on the pressure and quantity of the flow of the liquid, the type of thermostatic metal used, and the strength of the spring 43. If there should be only one pair of disks 44, 45 used, the collar 58 would not be used.

It will readily be seen that the wearing parts of the device may be quickly replaced. The valve 33 is replaced by removing the closure plug 24, and the thermostatic disks 44, 45 are removed by disengaging the cap member 14 from the disk portion 12 of the casing 9. The disks 44, 45 may be individually replaced by the removal of the annular members 50 and 49 without the necessity of replacing the entire thermostatic unit 44, 45, 47.

Having thus described our invention, we claim:

1. In a liquid flow controlling device, a casing having a pair of bosses adapted to connect the casing in a pipe line, a chamber in the casing spaced from the bosses, a valve chamber arranged in the casing between the bosses, a bore in the casing extending from the casing chamber to the valve chamber having a valve seat at the end adjacent the valve chamber and a restricted opening to the casing chamber, a passage connecting one of the bosses with the casing chamber, a second passage connecting the other boss with the bore intermediate the valve seat and restricted opening, a third passage connecting the valve chamber to the casing chamber, a valve mounted in the valve chamber to engage the valve seat and having a portion extending through the bore and restricted opening into the casing chamber and having a cross sectional area slightly smaller than the diameter of the restricted opening, a bi-metallic thermostatic element mounted in the casing chamber and connected to the extending portion of the valve, and means to yieldingly position the valve in engagement with the valve seat to close communication between the boss connected to the bore and the casing chamber and permit actuation of the valve to open position by the bi-metallic thermostatic element when the temperature of the liquid in the casing chamber rises above a predetermined degree.

2. In a liquid flow controlling device, a casing having a chamber with inlet and outlet ports and a valve chamber, the outlet port being in direct communication with the casing chamber, the inlet port having a restricted opening to the casing chamber to permit a limited quantity of liquid to enter said chamber, and the valve chamber opening to the inlet port and the casing chamber, a valve mounted in the valve chamber to control the communication between the inlet port and casing chamber through the valve chamber, a spring to urge the valve to close said communication between the inlet port and casing chamber, a member having a recess in one end adjustably mounted in the casing with the recessed end extending into the casing chamber, a carrier slidably mounted in the recess of the adjustable member and operatively connected to the valve, and a pair of disks of bi-metallic thermostatic material interposed at the center portion thereof between the carrier and the recessed end of the adjustable member to effect actuation of the valve against the force of the spring to open position when the temperature of the liquid in the casing chamber rises above a predetermined temperature by the disks moving in a direction from each other and actuating the carrier from the adjustable member.

3. In a liquid flow controlling device, a casing having a chamber with inlet and outlet ports and a valve chamber interposed between one of the ports and the casing chamber, a valve mounted in the valve chamber to control the connection of the valve chamber with said port and the passage of liquid through the casing and arranged with a portion extending into the casing chamber, a spring to urge the valve to closing position and the extending portion thereof into the casing chamber, and thermostatic means supported in the casing chamber by the valve extending portion and comprising an annular member and a pair of bi-metallic thermostatic disks of dish shape in cross section having the peripheral portions fixed in the annular member with the convex surfaces of the disks in opposed relation to each other to position the center portions in closer relation than the peripheral portions and the center portions of the disks being adapted to be loosely supported by the valve extending portion to impart movement of the disks to the valve against the force of the spring, said movement being effected by the movement of the loosely supported center portions of the disks caused by a rise in the temperature of the liquid in the casing chamber, and each disk being arranged with parallel straight edge portions spaced apart a distance less than the diameter of the annular member to eliminate the snapping of the disks and permit a greater movement of the disks by a low temperature.

4. In a liquid flow controlling device, a casing having a chamber with inlet and outlet ports and a valve chamber in axial alinement with the casing chamber opening to one of the ports and the casing chamber, a valve mounted in the valve chamber to control the connection of the valve chamber with said port and having a portion extending into the casing chamber, an abutment member having a recess in one end and adjustably mounted in a wall of the casing chamber in alinement with the valve portion extending into said chamber with the recessed end positioned in the casing chamber, a carrier comprising a shank portion slidably mounted in the recess of the abutment member and a head at the free end of the shank portion connected to the valve portion extending into the casing chamber, and pairs of dish shaped disks of bi-metallic thermostatic material engaged on the carrier shank, the disks of each pair of disks being juxtaposed with the convex surfaces in opposed relation, and one pair of disks being supported by the head of the carrier and each succeeding pair of disks being separated from the preceding pair of disks with the end pair of disks engaged by the abutment member.

5. A liquid flow controlling device as claimed in claim 4, wherein the pairs of disks are separated from each other by collars engaged on the shank of the carrier and interposed between the pairs of disks.

CHARLES F. SEMON.
ALBERT L. SEMON.